United States Patent
Cho et al.

(10) Patent No.: US 8,627,144 B2
(45) Date of Patent: Jan. 7, 2014

(54) METHOD FOR COMMANDING AND PERFORMING NETWORK ENTRY

(75) Inventors: Hee Jeong Cho, Anyang-si (KR); Ki Seon Ryu, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 12/933,396

(22) PCT Filed: Apr. 2, 2009

(86) PCT No.: PCT/KR2009/001698
§ 371 (c)(1),
(2), (4) Date: Sep. 17, 2010

(87) PCT Pub. No.: WO2009/123421
PCT Pub. Date: Oct. 8, 2009

(65) Prior Publication Data
US 2011/0016350 A1    Jan. 20, 2011

Related U.S. Application Data

(60) Provisional application No. 61/042,271, filed on Apr. 4, 2008.

(30) Foreign Application Priority Data

Apr. 24, 2008    (KR) .................. 10-2008-0038141

(51) Int. Cl.
*G06F 11/00*    (2006.01)

(52) U.S. Cl.
USPC .................. 714/23; 714/2; 714/4.1; 714/25

(58) Field of Classification Search
USPC .......................................... 714/23, 4.1, 25, 2
See application file for complete search history.

(56) References Cited

U.S. PATENT DOCUMENTS

| | | | |
|---|---|---|---|
| 2003/0074601 A1* | 4/2003 | Schultz et al. | 714/15 |
| 2005/0208945 A1 | 9/2005 | Hong et al. | |
| 2005/0278567 A1* | 12/2005 | Wolfe et al. | 714/11 |
| 2006/0094366 A1* | 5/2006 | Cho et al. | 455/67.11 |
| 2006/0195767 A1* | 8/2006 | Ihm et al. | 714/776 |
| 2007/0232305 A1* | 10/2007 | Jung et al. | 455/435.1 |
| 2008/0039095 A1 | 2/2008 | Yoon et al. | |
| 2008/0065944 A1* | 3/2008 | Seol et al. | 714/748 |
| 2009/0154401 A1* | 6/2009 | Arora et al. | 370/329 |

* cited by examiner

*Primary Examiner* — Sarai Butler
(74) *Attorney, Agent, or Firm* — Lee, Hong, Degerman, Kang & Waimey

(57) ABSTRACT

A method for commanding and performing network entry is disclosed. The method for commanding network entry using a non-periodic message in a Base Station (BS) includes broadcasting a first pattern indicating ready for restart once or more times to a Mobile Station (MS), when the BS determines to restart due to a serious error of the BS, and performing a restart procedure, and broadcasting a second pattern indicating network entry to the MS, upon completion of the restart procedure.

8 Claims, 3 Drawing Sheets

| Management Message Type | Restart Pattern |

METHOD FOR COMMANDING AND PERFORMING NETWORK ENTRY

CROSS-REFERENCE TO RELATED APPLICATIONS

This application is the National Stage filing under 35 U.S.C. 371 of International Application No. PCT/KR2009/001698, filed on Apr. 2, 2009, which claims the benefit of earlier filing date and right of priority to Korean Application No. 10-2008-0038141, filed on Apr. 24, 2008, and also claims the benefit of U.S. Provisional Application Serial No. 61/042,271, filed on Apr. 4, 2008, the contents of all of which are incorporated by reference herein in their entirety.

TECHNICAL FIELD

The present invention relates to network entry, and more particularly, to a method for commanding network entry to every Mobile Station (MS) in a Base Station (BS) and a method for performing network entry in an MS, when the BS restarts in a wireless access system.

BACKGROUND ART

FIG. 1 is a diagram illustrating a signal flow for a network entry procedure of an MS in a legacy Institute of Electrical and Electronics Engineers (IEEE) 802.16e network.

Referring to FIG. 1, the MS receives DownLink (DL)-MAP, DL Channel Descriptor (DCD), UpLink (UL)-MAP, and UL Channel Descriptor (UCD) messages from a BS and acquires DL and UL parameters from the received messages in step 110.

In step 111, the MS adjusts its timing offset and power-related parameter by initial ranging to the BS.

Upon receipt of a UL-MAP message including information about an initial ranging interval allocated to the MS, the MS randomly selects one of initial ranging codes and transmits the selected initial ranging code to the BS on the uplink during the initial ranging interval.

The MS and the BS can adjust UL transmission parameters of the MS by repeatedly exchanging a ranging code and a Ranging Response (RNG-RSP) message between them. If the UL transmission parameters are successfully adjusted, the BS transmits a code indicating success in an RNG-RSP message to the MS. Here, the BS allocates non-contention-based UL resources to the MS by a predetermined UL-MAP Information Element (IE) so that the MS can transmit a Ranging Request (RNG-REQ) message.

The MS transmits an RNG-REQ message including its Media Access Control (MAC) address using the allocated UL resources. Upon receipt of the RNG-REQ message, the BS transmits an RNG-RSP message to the MS, in order to allocate a basic Connection Identifier (CID) and a primary CID to the MS.

In step 112, the MS performs basic capabilities negotiation with the BS. The MS transmits supported parameters, that is, information about the capabilities of the MS to the BS and receives a response for the transmitted parameters from the BS during the basic capabilities negotiation of step 112.

The MS performs authorization and exchanges security keys with the BS in step 113. Then the MS registers to the BS in step 114 and performs authentication with an Authentication, Authorization and Accounting (AAA) server in step 120.

Finally, the MS transmits a Dynamic Service Add Request (DSA-REQ) message to and receives a Dynamic Service Add Response (DSA-RSP) message from the BS to establish a service flow with the BS in step 122.

Conventionally, it is defined that when a BS restarts during a normal operation, MSs perform network entry to the BS, recognizing the BS's restart. In case of a BS restart triggered by a serious error or an operator's intention, the BS transmits a BS Restart Count incremented by 1 to the MSs by a DCD message (every 10 s at maximum).

Table 1 below describes the definition of Restart Count in a DCD message in IEEE 802.16Rev2.

TABLE 1

| Name | Type (1 byte) | Length | Value (variable length) | PHY scope |
|---|---|---|---|---|
| BS Restart Count | 154 | 1 | BS Restart Count is incremented by 1 whenever the BS restarts. The value ranges from 0 to 255. | All |

Each time the BS restarts, it increments the Restart Count by 1. After receiving the DCD message, the MSs compare a previous BS Restart Count with a current BS Restart Count and determine whether the BS has restarted. If the BS has restarted, that is, if the current BS Restart Count is larger than the previous BS Restart Count, the MSs re-register to the BS by network entry. The received current BS Restart Count is stored in the MSs.

A Mobile Neighbor Advertisement (MOB_NBR-ADV) message (every 30 s at maximum) delivers Restart Counts of neighbor BSs. The MSs also store the Restart Counts of the neighbor BSs to perform the above-described operation during handover.

The BS restart caused by a serious errors or an operator's intention does not occur frequently. Even though the BS restarts due to a serious error or an operator's intention, the interval between such BS restarts is not short. Assuming that a serious error occurs every three days, the DCD message is transmitted 25,920 times and the MOB_NBR-ADV message is transmitted 8,640 times.

Accordingly, the BS transmits Restart Counts of 103,680 bytes (DCD: 77,760 bytes (3 bytes×25920) and MOB_NBR-ADV: 25,920 bytes (3 bytes×8640) in order to command network entry to the MSs. If there are two or more neighbor BSs, the MOB_NBR-ADV message carries more bytes according to the number of the neighbor BSs.

Thus, it is inefficient to transmit a restart-related parameter by a periodic message such as a DCD message or a MOB_NBR-ADV message.

DISCLOSURE OF INVENTION

Technical Problem

Accordingly, the present invention is directed to a method for commanding and performing network entry that substantially obviates one or more problems due to limitations and disadvantages of the related art.

An object of the present invention is to provide a method for commanding network entry in a BS in order to reduce the overhead of a message transmitted for BS restart and network entry.

Another object of the present invention is to provide a network entry method in an MS, for efficiently using radio resources, minimizing the time delay of network entry, and preventing an unnecessary operation before the network entry, when a BS restarts.

Technical Solution

To achieve these objects and other advantages and in accordance with the purpose of the invention, as embodied and broadly described herein, a method for commanding network entry using a non-periodic message in a Base Station (BS) includes broadcasting a first pattern indicating ready for restart once or more times to a Mobile Station (MS), when the BS determines to restart due to a serious error of the BS, and broadcasting a second pattern commanding network entry to the MS, upon completion of the restart procedure.

The first pattern broadcasting may include broadcasting the first pattern in a frame or superframe following a time when the serious error occurs.

The method may further include periodically broadcasting a Downlink Channel Descriptor (DCD) message without a restart count.

Each of the first pattern and the second pattern may be transmitted in a restart pattern field of a restart message transmitted by the BS.

The restart message may be positioned in a downlink burst region of a radio frame or a superframe transmitted by the BS.

In another aspect of the present invention, a method for entering a network according to a non-periodic message in a Mobile Station (MS) includes preparing for network entry, upon receipt of a first pattern indicating ready for restart from a Base Station (BS) having a serious error, and transmitting a ranging request message to the BS and entering the network, upon receipt of a second pattern commanding network entry from the BS.

The preparation may include postponing a service request and a ranging request until receiving the second pattern.

Each of the first pattern and the second pattern may be transmitted in a restart pattern field of a restart message transmitted by the BS.

The network entry may include entering the network by transmitting the ranging request message, upon receipt of the second pattern without receiving the first pattern.

It is to be understood that both the foregoing general description and the following detailed Advantageous Effects description of the present invention are exemplary and explanatory and are intended to provide further explanation of the invention as claimed.

Advantageous Effects

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Reference will now be made in detail to the preferred embodiments of the present invention, examples of which are illustrated in the accompanying drawings. Wherever possible, the same reference numbers will be used throughout the drawings to refer to the same or like parts.

Exemplary embodiments of the present invention provide a network entry method for MSs, in which a BS transmits restart messages of two predetermined patterns to the MSs according to restart time points of the BS, for efficient use of radio resources.

Figure 1:
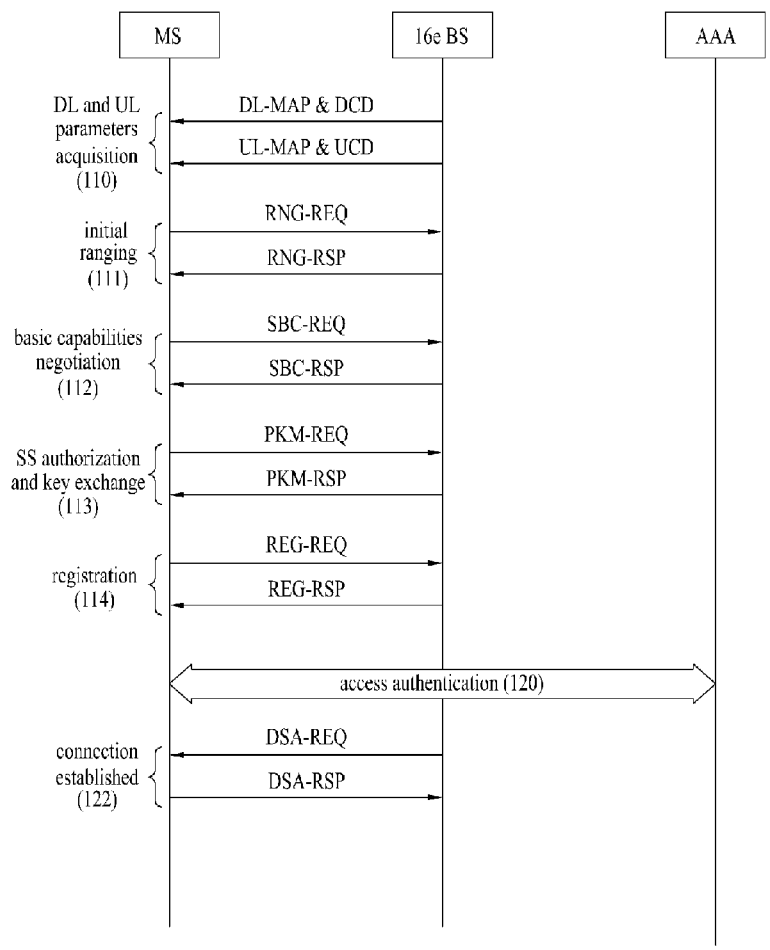
FIG. 1 is a diagram illustrating a signal flow for a network entry procedure of an MS in a legacy Institute of Electrical and Electronics Engineers (IEEE) 802.16e network.
Figures 2, 3:
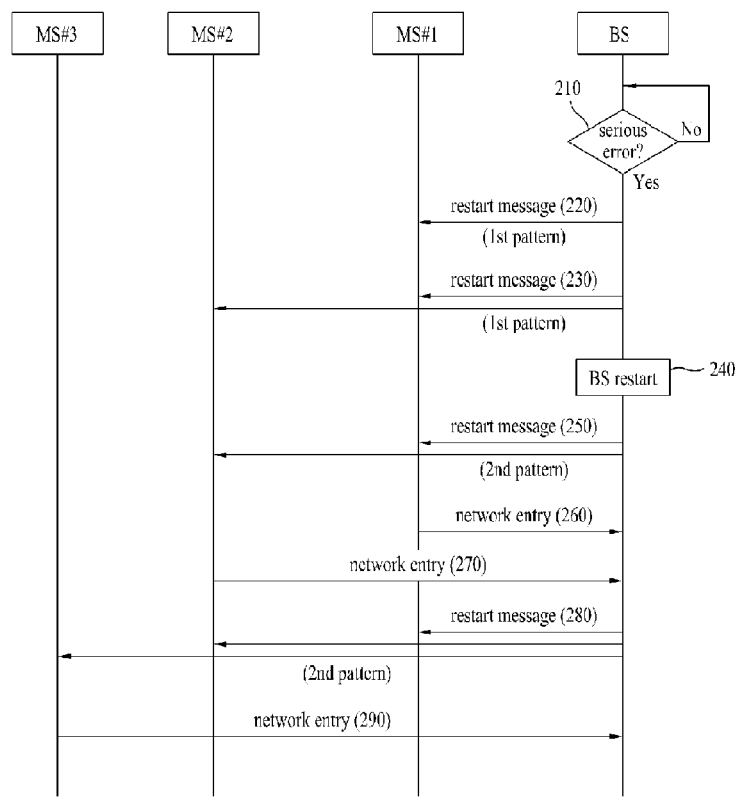
FIG. 2 is a diagram illustrating a signal flow for a network entry method according to an exemplary embodiment of the present invention.
FIG. 3 illustrates an exemplary format of a restart message, which is applied to the network entry method of FIG. 2.

FIG. 2 is a diagram illustrating a signal flow for a network entry method according to an exemplary embodiment of the present invention.

Referring to FIG. 2, when the BS determines to restart due to a serious error in step 210, it broadcasts a restart message having a first pattern indicating "Ready for restart" to first, second and third MSs, MS #1, MS #2 and MS #3 in step 220. In the illustrated case of FIG. 2, it is assumed that the second and third MSs MS #2 and MS #3 fail to receive the initial first-pattern restart message from the BS.

Upon receipt of the initial first-pattern restart message, the first MS MS #1 prepares for a BS restart-incurred network entry by delaying an additional service request, an additional ranging request, etc. until receiving a restart message having a second pattern.

The restart message can be broadcast more than once to minimize the number of MSs that fail to receive the restart message. The second MS, MS #2 receives a second first-pattern restart message in step 230 and prepares for network entry like the first MS, MS #1.

In the illustrated case of FIG. 2, it is assumed that the third MS, MS #3 fails to receive any first-pattern restart message, for example, due to handover, bad channel status, or the like.

Despite the failure to receive any first-pattern restart message, the third MS MS #3 may perform the BS restart-incurred network entry successfully because it can enter a network immediately when it receives a restart message having the second pattern.

Upon completion of the transmission of the first-pattern restart messages, the BS performs a restart procedure in step 240.

Upon completion of the restart procedure, the BS broadcasts a restart message having the second pattern indicating network entry to the first, second and third MSs, MS #1, MS #2 and MS #3 in step 250.

Upon receipt of the initial second-pattern restart message, the first and second MSs MS #1 and MS #2 enter the network by transmitting RNG-REQ messages to the BS in steps 260 and 270. In the illustrated case of FIG. 2, it is assumed that the third MS, MS #3 fails to receive the initial second-pattern restart message.

The second-pattern restart message may also be broadcast more than once. Upon receipt of a second restart message having the second pattern in step 280, the third MS MS #3 enters the network by transmitting an RNG-REQ message to the BS in step 290.

In the above operation, preferably, a DCD message transmitted periodically from the BS does not include the conventional Restart Count.

FIG. 3 illustrates an exemplary format of a restart message, which is applied to the network entry method of FIG. 2.

The restart message includes Management Message Type indicating that this message is a restart message and Restart Pattern implicitly indicating network entry or indicating a network entry time. The afore-described first and/or second pattern may be positioned in the Restart Pattern field.

A control channel such as a sub-MAP of a subframe, a MAP of a radio frame, a super-MAP of a superframe, or the like may provide information about the area of the restart message. The restart message may reside in a DL burst region of a radio frame or a superframe.

Figure 4:
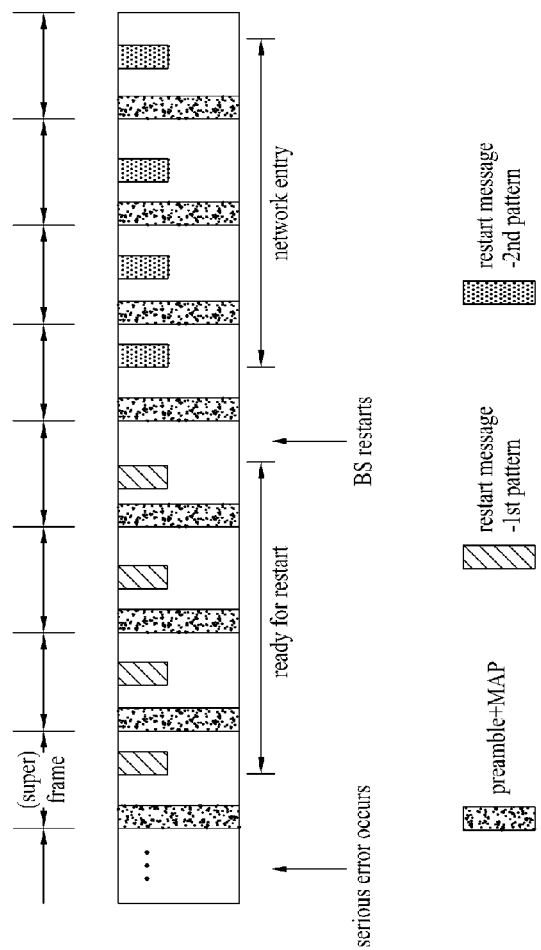
FIG. 4 illustrates an exemplary position of the restart message in a frame in the network entry method of FIG. 2.

FIG. 4 illustrates an exemplary position of the restart message in a frame in the network entry method of FIG. 2.

Referring to FIG. 4, the BS transmits a restart message having the first pattern indicating a restart ready state in a frame or superframe following an error occurrence time during a predetermined time period. An MS is aware from the first-pattern restart message that it will perform network entry. The first-pattern restart message may include information indicating when the network entry is performed (e.g. a superframe number or a superframe offset corresponding to a network entry time) in accordance with an exemplary embodiment of the present invention. For instance, if four first-pattern restart messages have superframe offsets in FIG. 4, the superframe offsets may be set to 4, 3, 2, and 1 for them, respectively. Meanwhile, the transmission of first-pattern restart messages may not be performed in the exemplary embodiment of the present invention.

After the BS restarts, it transmits a restart message having the second pattern indicating a restart state during a predetermined time period. Upon receipt of a first-pattern restart message, an MS postpones an operation such as an additional service request or a network entry attempt until after receiving a second-pattern restart message. Upon receipt of the second-pattern restart message, the MS performs network entry. Even through an MS that has performed network entry receives the second-pattern restart message during the predetermined time period, it neglects the second-pattern restart message without performing network entry. For example, when an MS receives an initial second-pattern restart message and performs network entry in FIG. 2, it neglects second, third and fourth second-pattern restart messages. If an MS fails to receive a first-pattern restart message but successfully receives a second-pattern restart message, it performs network entry. A handover MS also performs the same operation.

The restart messages can be classified as additional broadcast messages. That is, the MS may determine whether a restart message is transmitted, based on an additional broadcast message indicator of a SuperFrame Header (SFH).

In accordance with the exemplary embodiments of the present invention, the overhead of control signaling may be reduced through efficient use of radio resources because MSs perform network entry by receiving a restart message. Also, two different patterns indicating a restart ready state and a restart state, respectively are transmitted in restart messages. Hence, the MSs can postpone unnecessary operations such as a request for a new service.

If a restart message is 2 bytes in total length and transmitted eight times, 16 bytes are transmitted for one BS restart, compared to at least 103,680 bytes taken for the conventional BS restart. Therefore, the BS may request an MS to perform the same operation through allocation of less radio resources.

As is apparent from the above description, radio resources are efficiently used because the use of a non-periodic restart message obviates the need for commanding network entry to an MS by a periodic DCD or MOB_NBR-ADV message. Also, since network entry is commanded to all MSs in the vicinity of a restart time, the time delay of a restart and network entry is reduced. Further, the MSs are ready for the network entry in advance and thus unnecessary operations are avoided for the MSs.

Industrial Applicability

The exemplary embodiments of the present invention provide a method for commanding network entry to all MSs by a BS and a method for performing network entry in an MS, when the BS restarts in a wireless access system. The exemplary embodiments of the present invention are applicable to apparatuses such as a BS, an MS, etc. in a mobile communication system like IEEE 802.16m.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for commanding network entry at a Base Station (BS), the method comprising:
broadcasting a first pattern indicating that the BS is ready for restart one or more times to a Mobile Station (MS) during a period between an error occurrence time and a time at which the BS restarts;
performing a restart procedure; and
broadcasting a second pattern indicating the network entry to the MS one or more times upon completion of the restart procedure,
wherein the first pattern and the second pattern are different from each other,
wherein at least the first pattern or the second pattern is allocated to a downlink burst region of a frame,
wherein the downlink burst region allocated is indicated by a control channel of the frame, and
wherein the first pattern further indicates that the MS postpones an additional service request or a network entry attempt until the MS receives the second pattern.

2. The method according to claim 1, wherein broadcasting the first pattern comprises broadcasting the first pattern in a frame or superframe following the error occurrence time.

3. The method according to claim 1, further comprising:
periodically broadcasting a Downlink Channel Descriptor (DCD) message without a restart count.

4. The method according to claim 1, wherein each of the first pattern and the second pattern is transmitted in a restart pattern field of a restart message transmitted by the BS.

5. A method for entering a network at a Mobile Station (MS), the method comprising:
preparing for entering the network upon receipt of a first pattern from a Base Station (BS), the first pattern indicating that the BS is ready for a restart; and
entering the network by transmitting a ranging request message to the BS upon receipt of a second pattern from the BS, the second pattern indicating the network entry,
wherein the receipt of the first pattern occurs during a time period between an error occurrence time of the BS and a time at which the BS restarts,
wherein the first pattern and the second pattern are different from each other, wherein at least the first pattern or the second pattern is allocated to a downlink burst region of a frame, wherein the downlink burst region allocated is indicated by a control channel of the frame, and wherein the first pattern further indicates that the MS postpones an additional service request or a network entry attempt until the MS receives the second pattern.

6. The method according to claim 5, wherein preparing for entering the network comprises postponing a service request and a ranging request until the receipt of the second pattern.

7. The method according to claim 5, wherein each of the first pattern and the second pattern is received in a restart pattern field of a restart message received from the BS.

8. The method according to claim 5, wherein entering the network comprises entering the network by transmitting the ranging request message, upon receipt of the second pattern without receiving the first pattern.

* * * * *